UNITED STATES PATENT OFFICE.

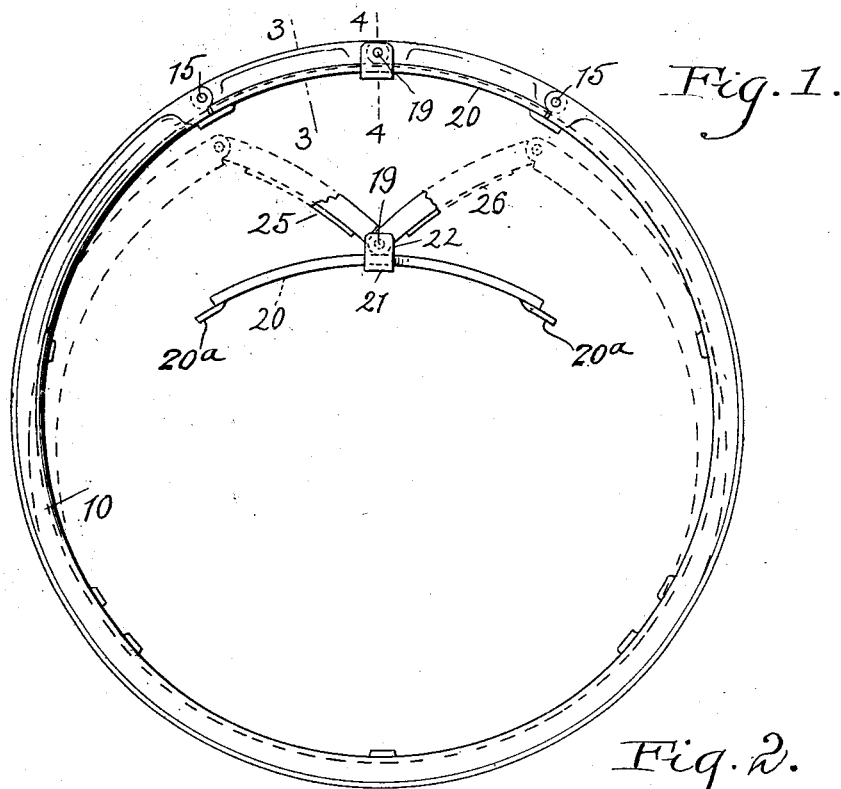
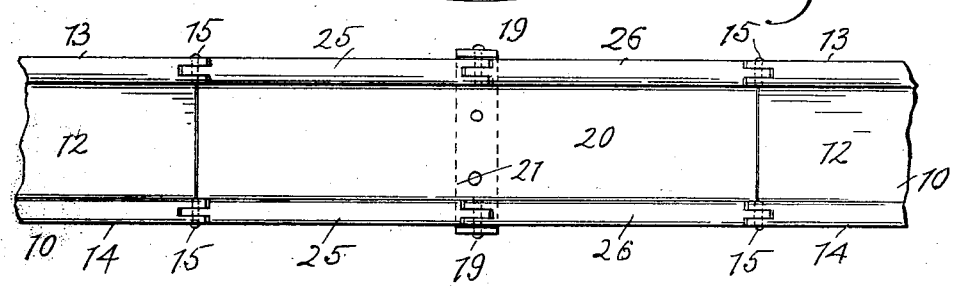
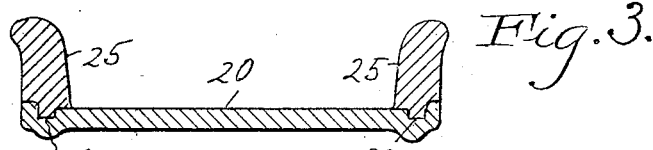
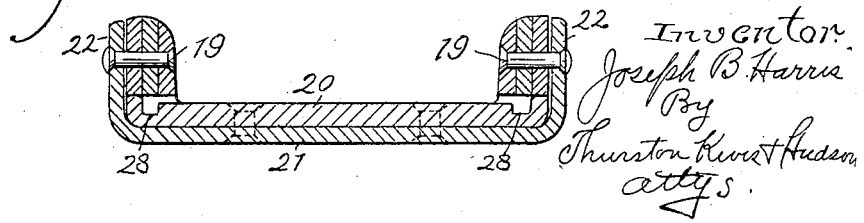

JOSEPH B. HARRIS, OF CLEVELAND, OHIO.

DEMOUNTABLE RIM.

1,377,771.  Specification of Letters Patent.  Patented May 10, 1921.

Application filed June 16, 1919. Serial No. 304,372.

*To all whom it may concern:*

Be it known that I, JOSEPH B. HARRIS, a citizen of the United States, residing at Cleveland, in the county of Cuyahoga and State of Ohio, have invented a certain new and useful Improvement in Demountable Rims, of which the following is a full, clear, and exact description.

This invention relates to demountable rims for holding pneumatic tires. The object of the invention is to provide a demountable rim which may be easily contracted to facilitate the removal and application of a tire, and be easily expanded so as to hold the tire. Another object is to impart to such a rim the strength necessary to resist the strains thereon incident to use. Another object is to provide a rim of this character which may be applied to the same wheels that are adapted for holding the commonly used one piece split rim, and may be held on the said wheel with the same appliances for this purpose with which the wheel is equipped.

The invention consists in the construction and combination of parts shown in the drawing and hereinafter described and pointed out definitely in the appended claims.

In the drawings, Figure 1 is a side view of a rim in which the present invention is involved, said rim being shown in full lines in an expanded condition, and in dotted lines in its contracted condition. Fig. 2 is a top view of the rim as shown in Fig. 1; Fig. 3 is a radial section in the plane indicated by the line 3—3 on Fig. 1; Fig. 4 is a radial section in the plane of line 4—4 on Fig. 1.

The rim includes a main section 10 of the conventional channel form; that is, it has a base portion 12 and two outwardly extended flanges 13, 14, along the sides of the base. This section 10 is of such length that when expanded it extends through 330° more or less of a circle. In the construction of this section it is given a "set" which disposes it to contract to the shape shown by the dotted lines in Fig. 1. But when the adjacent ends of this section are thrust apart by the mechanism shown, provided for that purpose, this section will assume a circular form, but there will be a gap between the ends thereof.

20 represents a rim section adapted to fill this gap. It is a flat plate bent into arcuate form, and it has preferably longitudinal grooves 28 in its top surface near its side edges extending from end to end, and it is wider than the base portion of the section 10. At the ends of the section 20 are two tongues 20ª which are offset inwardly so that when the section 20 is fitted between the ends of the section 10 these tongues will overlap and engage the inner surfaces of the end portions of said section 10.

This rim section 20 is secured in a saddle 21 located midway between its ends. This saddle is a plate which is bent into the form of a flat U, the sides 22 of which extend outward adjacent opposite sides of the rim section.

Associated with each of the side flanges 13, 14, of the section 10, is a pair of toggle links 25, 26. The two links of each pair are pivoted together forming the toggle joint. The toggle joints of both pairs go inside of the saddle, and the same alined pivot pins 19 which connect links also connect said links with the sides of the saddle. The two pairs of toggle links are pivoted respectively to the flanges 13, 14, on alined pivots 15; and the pivots 19 which connect the two pairs of links are alined, and are held in alinement by the saddle. The two pairs of toggle links and the saddle form a compound toggle which when broken or bent inward draws or permits the two ends of the section to come toward one another, as shown in dotted lines in Fig. 1, thereby so contracting the rim that the tire may be put on or taken from it.

When the parts are in this contracted position, the section 20 hangs loosely on the toggle joint. When the joint of this compound toggle is moved outward to the position shown in full lines in Fig. 1, the ends of the section 10 will be thrust apart, and the section 20 will be carried between the gap in said ends. The toggle joint will pass slightly over the center,—that is move outward beyond a line joining the two end pivots of the toggle. Therefore, the tendency of the section 10 to contract will be effectually resisted by the toggle.

When rim section 20 enters the gap between the ends of the base portion of section 10, the outer surface of section 20 will come in contact with the inner edges of the toggle links. This will limit the outward movement of the section 20, and this limitation will become effective when section 20 is alined with the base portion 12 of section 10. Additional cleats 23 may be secured to the section 10, at its ends, and may project beyond said ends and engage the inner surface of section 10 when section 20 is in the gap between the ends of section 10.

The links are also alined with the flanges on section 10, and serve as side flanges of that part of the rim for which the section 20 furnishes the base. As stated, there are preferably longitudinal grooves 28 in the outer surface of the section 20, said grooves being of such shape and size that the inner edges of the links may enter them, as shown in Figs. 3 and 4. This braces that part of the rim intermediate of the two ends of section 10, and braces the link pivots, and imparts to this part of the rim adequate strength to resist side thrusts.

It is desirable that the opposed surfaces of the toggle links shall be practical continuations of the opposed surfaces of the side flanges of the section 10. To bring about this result each of the several toggle joints is formed in the manner shown in the drawing. The ends of the flanges 13 and 14 may be slotted, and the ends of the links may be flattened to form ears 29 which fit within said slots. One of the links may be slotted at its other end and the companion link may be flattened at its end to form an ear which enters said slot.

As a matter of preference the hole for the valve stem is located diametrically opposite the gap in the rim section 10. On nearly all rims in use are what are known as felly stays. These are projections of some form or another, on the inner face of the rim, and the wheel felly is formed with specially located depressions for receiving them, so that as they engage the turning of the rim on the felly and the strain on the valve stem may be prevented. Nearly all makers of rims and felly bands make these depressions and projections of different shape, and locate them in different places with respect to the valve stem hole. This makes it practically impossible to put any rim on any felly band except the one provided with the properly placed depressions. But it is the very general practice to use wedge clips for holding the rims on the felly bands; and it has come about that nearly all makers use the same number of clips on the same size wheels, and space them equally, and put them at the same distance from the valve stem hole in the wheel. I propose to make use of this fact so far as it is a fact to enable the application of my rim to any wheel. To do this two cleats or projections 40, 40, are secured to the inner surface of the rim, in such positions that when the rim is put onto a wheel, with the valve stem of the tire going through the hole in the wheel, a wedge clip will go between these cleats and thereby prevent rotation of the rim on the wheel.

Having described my invention, I claim:—

1. A demountable rim comprising, in combination, a long rim section of channel form, two pairs of toggle links, whereof the links of one pair are pivoted together and are pivotally connected with the ends of the flange on one side of the long rim section, and the links of the other pair are pivoted together and to the ends of the other flange of the long rim section, the three pivots of the links of one pair being alined with the corresponding pivots of the links of the other pair, and an arcuate plate which is constructed to fill the gap between the base part of the long rim section and is pivotally hung on both pairs of toggle links on an axis which is coincident with the alined axes of the joints between the two pairs of toggle links.

2. A demountable rim comprising, in combination, a long rim section of channel form, two pairs of toggle links whereof the links of one pair are pivoted together and are pivotally connected with the ends of the flange on one side of the long rim section, and the links of the other pair are pivoted together and to the ends of the other flange of the long rim section, the three pivots of the links of one pair being alined with the corresponding pivots of the links of the other pair, and an arcuate plate which is constructed to fill the gap between the base part of the long rim section and is pivotally hung on both pairs of toggle links on an axis which is coincident with the alined axes of the joints between the two pairs of toggle links, said arcuate plate lying wholly inside of said toggle links and being extended laterally beneath the links of both pairs whereby, when the arcuate plate is in the gap between the ends of the base part of the long rim section, the toggle links will engage said plate and stop further movement away from the axis of the rim and will likewise serve as side flanges for said arcuate plate.

3. A demountable rim comprising in combination a long rim section of channel form,—two pairs of pivoted together toggle links which at their ends are respectively pivoted to the side flanges of said long rim section, an arcuate plate constructed to fit the gap between the ends of the base portion of the first mentioned rim section, a saddle in which said arcuate plate is secured,—the sides of said saddle being pivoted to the toggle joint of said pairs of links.

4. A demountable rim comprising in combination a long rim section of channel form,—that is having a base portion and outwardly extended flanges at the sides thereof, two pairs of pivoted together toggle links which at their ends are respectively pivoted to said flanges, an arcuate plate constructed to fit the gap between the ends of the base portion of the first mentioned rim section, a saddle in which said arcuate plate is secured,—the sides of said saddle being pivoted to the toggle joints of said pairs of links, said arcuate plate being of such width that it extends under both pairs of links whereby the outer surface of the plate will engage the inner edges of said links when said arcuate plate is in the gap between the two ends of the main rim sections.

5. A demountable rim comprising in combination a long rim section of channel form,—two pairs of pivoted together toggle links which at their ends are respectively pivoted to the flanges of said long rim section, an arcuate plate constructed to fit the gap between the ends of the base portion of said long rim section, a saddle in which said arcuate plate is secured,—the sides of said saddle being pivoted to the toggle joints of said pairs of links, said arcuate plate being of such width that it extends under both pairs of links, and said plate having in its outer surface near its sides grooves into which the inner edges of said links will project when the arcuate plate is in the gap between the two ends of the main rim sections.

6. A demountable rim comprising, in combination, a long rim section of channel form, two pairs of pivoted together toggle links which at their ends are respectively pivoted to the ends of said rim section, an arcuate plate constructed to fit the gap between the ends of the base portion of the long rim section, which arcuate plate is pivotally hung at a single point to both pairs of toggle links on an axis which is coincident with the alined axes of the joints between the two pairs of toggle links.

7. A collapsible wheel rim, comprising a primary section and a secondary section and toggle links connecting said sections and forming side flanges for the rim.

8. In a collapsible wheel rim, a main section and an intermediate section having channeled sides, and toggle links pivotally connected to the center of said intermediate section and to the ends of said main section and adapted to seat within said channeled sides.

9. In a collapsible wheel rim, a main section having side flanges, an intermediate section, and toggle links pivotally uniting said sections and forming side flanges for said intermediate section.

10. A collapsible wheel rim, comprising a flanged main section, an intermediate bracing section having ears midway at each side thereof, and toggle links connected to said ears and to the ends of said main section.

11. A collapsible wheel rim, comprising a main section having side flanges, a section having an ear and a channel at each side and a tongue at each end, and toggle links connected to each other and said ears and to the ends of said main section and adapted to seat within said channels.

In testimony whereof, I hereunto affix my signature.

JOSEPH B. HARRIS.